A. C. JENSON & J. MATHISON.
Improvement in Rotary Harrows.
No. 125,572. Patented April 9, 1872.
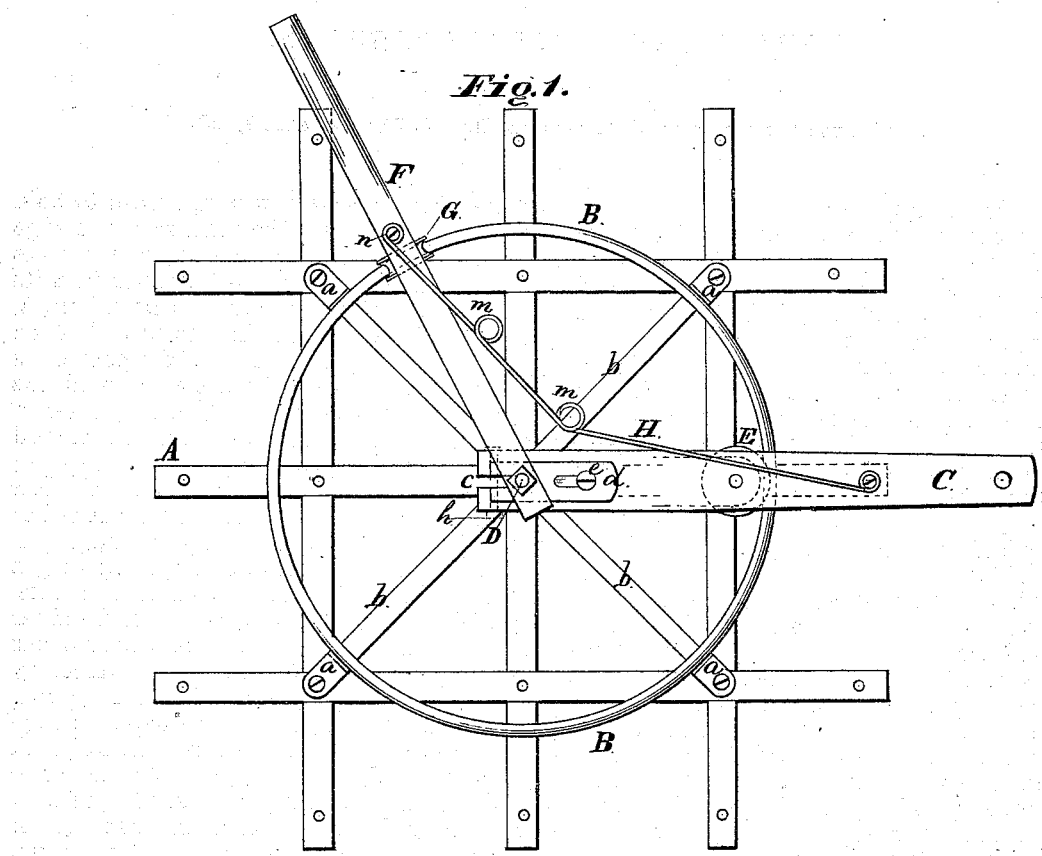
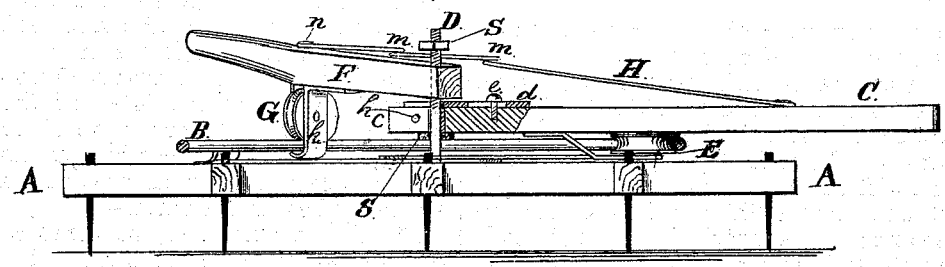
Witnesses.
H. L. Perrine
W. Burris
Inventors
Andrew C. Jenson
James Mathison
By their Attorney
G. B. Towler 125,572

UNITED STATES PATENT OFFICE.

ANDREW C. JENSON AND JAMES MATHISON, OF FREMONT, NEBRASKA.

IMPROVEMENT IN ROTARY HARROWS.

Specification forming part of Letters Patent No. 125,572, dated April 9, 1872.

*To all whom it may concern:*

Be it known that we, ANDREW C. JENSON and JAMES MATHISON, of Fremont, in the county of Dodge and State of Nebraska, have invented a new and useful Improvement in Rotary Harrows; and we do hereby declare that the following is a full, clear, and exact description of the construction and operation of the same, reference being had to the accompanying drawing making a part of this specification, in which—

Figure 1 is a plan view; Fig. 2, a sectional view.

Like letters in both figures of the drawing indicate like parts.

Our invention relates to that class of rotary harrows in which the draft of the pole is changed from the center to the edge of the harrow or retained in the center, as may be desired; and the invention consists of a slotted plate and set-screw in combination with the slotted end of the pole and the center post, having screw-threads to receive screw-nuts thereon, so as to keep the flanged roller of the pole on the inner edge of the iron circle attached to the top of the harrow when the draft has been changed from the center to the edge of the same, and at the same time permit the pole to be raised or lowered to suit the team.

A is the harrow; B, the iron circle, attached by the supports $a$ to the top of the same. The supports, or what might be termed knee-plates, rest upon the ends of the diagonal braces $b$, and are bolted through them to the beams of the harrow. C, the draft-pole, provided on its rear end with an elongated slot, $c$, in which the post D is attached to the center of the harrow; E, the flanged roller attached to the under side of the pole, and arranged so as to have a bearing upon the inner side of the circle. To divert the draft from the center to the edge of the harrow we arrange a plate, $d$, on the upper side of the pole in such a manner with the center post that, by means of a slot in the plate and a set-screw, $e$, passed through the same into the pole, the plate can be adjusted to divert the draft of the pole to the circle or edge of the harrow by moving the end of the plate against the center post and at the same time pressing the pole forward until the roller has a firm bearing upon the inner edge of the circle, after which the set-screw is tightened to hold the plate. To divert the draft from the edge to the center of the harrow we move the plate just back enough to release the roller from its bearing upon the circle and insert a bolt, $h$, through a hole made in the slotted end of the pole immediately in the rear of the post, so as to form a bearing on the latter to hold the pole, thus diverting the draft to the center of the harrow. F is the lever, having a pivotal connection with the center post over the pole; G, a flanged roller, attached by knee-plates $k$ to the under side of the lever, and arranged to turn upon the circle, so that by pressing upon the lever with the hand, or applying weight thereto, the harrow can be made to rotate. The lower end of the knee-plate, on the inner side of the roller, is formed like a hook under the circle, so that the harrow can be raised by the levers to clear it of weeds or other obstructions, or rotated from side to side, as the operator may require. H is the rod, formed with a suitable number of loops, $m$, and attached to the draft-pole. The lever is kept in position, when changed to make the harrow run deep in front or behind, by placing a loop of the rod over a pin or bolt, $n$, attached to the top of the lever. The center post is made with screw-threads and provided with screw-nuts S S, one being under the pole and the other over the lever. Thus, when the front end of the pole is adjusted to suit the team it is held in position by the screw-nut below being screwed up against the pole, and the screw-nut above being screwed down on the lever.

Having thus fully described our invention, what we claim therein as new, and desire to secure by Letters Patent, is—

The slotted plate $d$ and set-screw $e$, in combination with the slotted end $c$ of the pole C and center post D, having screw-threads to receive the screw-nuts S S, substantially in the manner as herein shown and described.

As evidence that we claim the foregoing as our invention we have hereunto set our hands and seals in the presence of two witnesses this 30th day day of December, 1871.

ANDREW C. JENSON. [L. S.]
    JAMES MATHISON. [L. S.]

Witnesses:
    ERNEST OSTENBERG,
    WILLIAM MARTIN.